July 7, 1970           J. E. BEBINGER           3,519,796

DOMESTIC DISHWAHER CONTROL

Filed Oct. 17, 1968

WITNESSES
Theodore F. Wrobel
James F. Young

INVENTOR
Jack E. Bebinger
BY Edward C. Arenz
ATTORNEY

United States Patent Office 3,519,796
Patented July 7, 1970

3,519,796
DOMESTIC DISHWASHER CONTROL
Jack E. Bebinger, Columbus, Ohio, assignor to Westinghouse Electric Corporation, Pittsburgh, Pa., a corporation of Pennsylvania
Filed Oct. 17, 1968, Ser. No. 768,456
Int. Cl. F24h *1/00;* H05b *1/00*
U.S. Cl. 219—334          2 Claims

ABSTRACT OF THE DISCLOSURE

A domestic dishwasher having an electrical heater used for boosting the water temperature and including a thermostatic switch responsive to the water temperature for effecting reenergization of a timer motor during at least one interruption of the cycle for the purpose of insuring an adequate water temperature includes means readily accessible to and exposed to the user of the dishwasher for varying the thermostatic switch setting so that the user selects the temperature she believes best for certain portions of the cycle in accordance with the dishwashing load.

BACKGROUND OF THE INVENTION

Field of the invention

The invention pertains to the art of domestic dishwasher control, and especially to that portion thereof relating to the control of water temperature in the dishwasher.

Description of the prior art

It is known to provide an electrical heating element in the dishwashing chamber which is energized at least part of the time during one or more washing or rinsing operations for the purpose of boosting the water temperature. It is also known to provide this arrangement in a dishwasher of the character in which the timer motor is interrupted in its operation at least once during a washing and rinsing operation and will then not be energized to advance the timing means until a thermostatic switch responds to a water temperature at least equal to the established water temperature of the thermostatic switch. After the thermostatic switch closes in response to this water temperature, the timer motor is reenergized through the thermostatic switch to continue its advance through closure of a timer motor control switch closed by the reenergization and operation of the timer motor after its interruption.

The known prior art arrangement does not permit the user to vary the temperature at which the thermostatic switch will close. I consider it desirable that this flexibility be available to the user of the dishwasher so that the user may exercise her own judgment as to the proper temperature for different types of dishes and washing operations.

SUMMARY OF THE INVENTION

In accordance with my invention I provide a dishwasher which is generally conventional in the respects just described in connection with the prior art, but which additionally includes the improvement of means for adjusting the water temperature setting of the thermostatic switch, and means mounting the adjustable control for the thermostatic switch in a position exposed to and readily accessible for manipulation by the user of the dishwasher.

DRAWING DESCRIPTION

Figure 1:
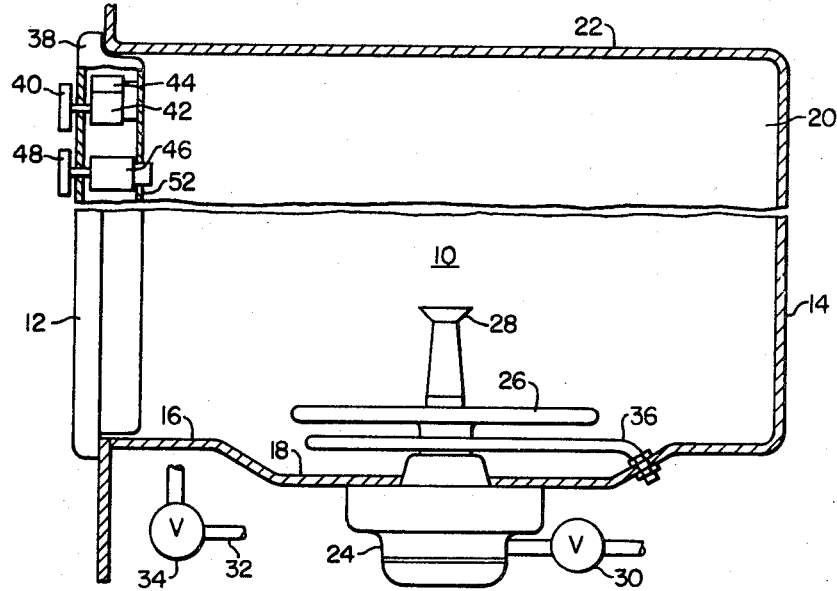
Figure 2:
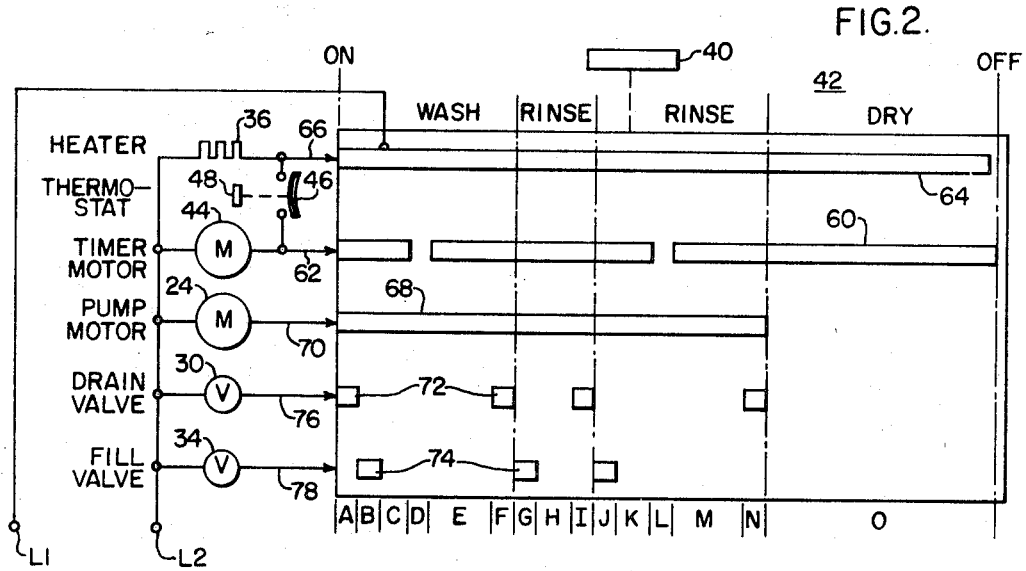
Figure 3:
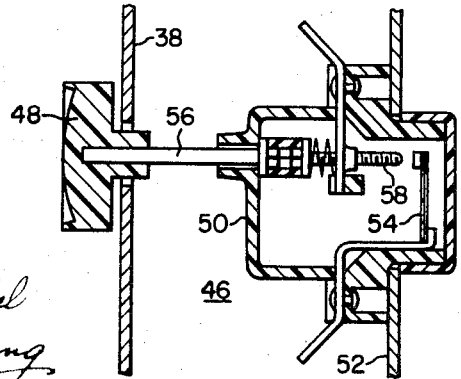

FIG. 1 is a fragmentary side view, partly diagrammatic, and partly in section, of a domestic dishwasher embodying the invention;

FIG. 2 is a diagrammatic view of an exemplary control arrangement and a developed timer cycle chart showing typical operational sequences during a single example of a complete cycle of operation of the washer; and FIG. 3 is an enlarged vertical sectional view illustrating one example of a structural arrangement for an adjustable thermostatic switch susceptible for use in carrying out the invention.

DESCRIPTION OF THE PREFERRED EMBODIMENT

Referring to the drawing, the invention is shown as incorporated in a front opening type undercounter dishwasher. The washing chamber 10 is defined by a front door 12 hinged along its lower edge to permit it to be swung down to a horizontal position for access to the chamber, a rear upright wall 14, a bottom wall 16 with a central depressed sump 18, opposite uright side walls 20, and a top wall 22. The dishes to be washed in the washing chamber are supported in suitable openwork dishracks (not shown).

Some of the operating components for the dishwasher are shown in diagrammatic form in FIG. 1. The water connections between various parts are only partly shown in FIG. 1 since they may be conventional. The main motor and pump assembly 24 is carried below the sump 18 and draws water from the sump by operating internal pump means and normally forces the water up into the rotatable horizontal spray arm 26, and into the spray distributing device 28 which directs water into the upper part of the washing chamber. The motor and pump assembly also pumps the water out of the washing chamber during drain periods when the drain valve 30 is actuated to an open position from its normally closed position. The water for washing and rinsing is admitted into the chamber from a supply line 32 provided with a solenoid actuated fill valve 34. The pump arrangement may be of the character disclosed and claimed in Long et al. U.S. Pat. 3,210,009.

The lower portion of the tub contains an electrical heating element 36 which functions to boost the water temperature in the tub or washing chamber, and to provide heat during the drying operation of the dishwasher.

To provide the user of the dishwasher with the ability to select the cycle desired, a control panel 38 is provided on the upper part of the door, for example, on which is arrayed indicator lights, and various switches and knobs which may be manipulated by the user. The knobs include a timer knob 40 which is turned to initiate a particular cycle of operation by rotating the timing means 42 diagrammatically illustrated in FIG. 1 to a position in which a timer motor 44 associated with the timing means is energized. In the illustrated embodiment the control panel is also provided with a thermostat assembly generally designated 46 and having a knob 48 exposed to the user and readily accessible for adjusting the thermostat.

One example of one general structural arrangement of the thermostatic assembly 46 is shown in FIG. 2.

In that example the thermostatic assembly 46 includes a casing 50 which is secured to the inner wall or panel 52 of the door with the thermally responsive element such as bimetal 54 exposed to the temperature of the interior of the washing chamber. The housing supports a rotatable shaft 56 to which the knob 48 is attached, the opposite ends of the shaft being coupled to an adjustment screw 58 which upon being rotated in one direction and another by the rotation of the knob 48 is moved toward and away from the bimetal 54. The bimetal and the adjustable screw 58 are electrically connected to terminals which are in turn connected by leads (not shown) to other components as in FIG. 3. It will be appreciated that the thermostatic assembly 46 is illustrated in only one form, and that it may, in accordance with conventional practice in the field of adjustable thermostatic controls, take any of various other forms. For the purposes of the invention, it is only necessary that the thermal element reflect changes in water temperature, and that the means for manipulating the adjustment of the thermostatic assembly be exposed to and readily accessible to the user of the dishwasher. Thus the assembly will be typically mounted adjacent the other controls.

The connections between the various electrical components described in connection with FIGS. 1 and 2 are shown in FIG. 3 is association with a chart indicating the sequence of operations during a complete cycle of typical character. The timing means 42 is shown in the form of a cylinder laid out in developed form and in which the horizontally aligned bar portions indicate conductive surfaces commonly connected (connections not shown) to one electric supply L1. Various portions of the cycle corresponding to time periods are indicated by the alphabetical divisions from left to right along the base of the chart also identified by the numeral 42. Each of the lengths from left to right indicated by an alphabetical division is directly proportional to time, except for the divisions indicated by the letters D and L. It is to be understood that the timer motor 44 drives the timing means 42 when the timer motor is energized. Additionally, the control knob 40 may be used to manually advance and override the timing means 42.

The electrical power supply is indicated by the lines L1 and L2. The arrows at the left edge of the chart identified as the "ON" edge represent pickup terminals or the like which connect the various components to which they are attached to the L1 side of the power line through the timing means. It is again noted that each of the bar portions on the timing means 42 is directly connected to the L1 side of the line, although the connecting lines are omitted from the chart to enhance the chart's clarity.

The timer motor 44 is energized through a circuit which includes the line L1, any portion of the segmented bar 60, and its pickup line 62 connected to the one side of the timer motor 44. The timer motor 44 may also be energized through an alternate circuit which includes the power line L1, the continuous power bar 64, the pickup line 66, and the thermostatic switch assembly 46 when it is closed in response to a water temperature equal to or in excess of the water temperature to which the thermostatic switch is set.

The pump motor 24 is energized through the bar segment 68 and its pickup line 70, while the drain valve and fill valve are energized during the time periods corresponding to the segments 72 and 74 through the respective pickup lines 76 and 78.

In the circuit arrangement shown the heater 36 is connected for constant energization while the dishwasher is operating through the power bar segment 64 and pickup line 66. It will be appreciated that in an alternative arrangement the heater 36 may be connected to an independent pickup line which would be arranged to be energized through segments corresponding to the D and L time periods which, as noted before are variable in accordance with whether the water temperature is adequate to close the thermostatic switch 46, or whether a period of heating by the heater 36 is required before the thermostatic switch 46 closes.

The general operational sequence with the circuit arrangement as described is as follows. The dishwasher is initially energized by manually advancing the control knob 40 to turn the timing means or timing cylinder 42 sufficiently that the timer motor 44 is energized through the bar segments 60 to start the incremental advance of the timing means. The pump motor 24 is also energized through the bar 68, and the drain valve 30 is opened through the bar segment 72 to purge the sump of any residual water during the time period A. During the period B, the fill valve 34 is energized through a contact segment 74 to admit water into the washing chamber with the drain valve closed. The heater 36 in the arrangement shown is also energized during this time, although as noted before, in an alternative arrangement it need not be energized. During the period C a washing operation occurs with the water being hurled about the chamber while heat is picked up by the water through the energization of the heater 36, and the thermostatic switch 46 reflects the temperature of the heater water by being exposed thereto. When the beginning of period D is reached, the timer motor 44 is deenergized to stop the timing means 42 by virtue of the timer motor pickup 62 running off the edge of the first segment 60. If the temperature of the water in the tub as reflected by the thermostatic switch 46 is below the temperature to which the thermostatic switch 46 is set, the timer motor 44 will remain deenergized. The heater 36, which is energized during this time, continues to transfer heat to the water which is being hurled about the washing chamber, and atfer sufficient heat has been picked up by the water and is reflected by the thermostatic switch 46, the thermostatic switch 46 moves to a closed position to reenergize the timer motor 44 through the power bar 64, the pickup line 66, and the closed thermostatic switch 46 which is connected to the timer motor 44 to provide the alternate energization.

As the cycle continues, additional washing takes place with the high temperature water, then a first rinse during the periods G–I inclusive, and then a final rinse during the period J through N, with another potential pause for the purpose of insuring sufficiently hot water during the time period L. During the time period O, drying takes place with the heater being energized, and the timer motor continuing the advance of the timing means by virtue of its energization through the last bar segment 60.

The essence of the arrangement according to the invention is the provision of means permitting the user to readily change the temperature setting of the thermostatic switch 46. If the user washes plastic dishes for example the knob 48 may be turned to a low setting such as, say 140° F. Alternatively, if fine china is being washed, and the user believes that the china should be subjected to a water temperature of at least 180° F. or so, the knob 48 may be set to the high position so that unless the water temperature is at least 180° when the D and L periods are reached, the time motor 44 will remain stalled until this water temperature is attained.

It will be appreciated, of course, that the factor of the entering water temperature into the dishwasher has a significant effect upon the condition of the thermostatic switch 46. In other words, if the knob 48 were turned to a position of say 140° F., and the entering water temperature was normally in the order of 160 to 175°, the thermostatic switch 46 would remain closed throughout the entire cycle and no deenergization of the timer motor 44 would occuring during the time periods D and L.

It will also be understood that if the heater 36 is not connected for constant energization, but rather only during the time periods D and L, and during the drying period O, then if the entering water temperature is significantly below the thermostatic switch setting, the time periods D and L will be rather lengthy while the heater is energized to bring the water temperature up to the setting of the thermostatic switch.

The invention may be incorporated in dishwashers of the built-in undercounter type, the convertible type, or the portable type, irrespective of where the control panel is located, so long as the thermostatic switch is exposed to or reflects the temperature of the washing water, and so long as the control knob 48 which is manipulated by the user is readily accessible.

What is claimed is:

1. In a dishwasher having a water chamber with a sump with electric heating means therein, timer means for controlling the sequence of operation of said dishwasher including a timer motor normally energized to drive said timer means and subject to a self-induced interruption at least once during a washing period, thermostatic means located above said sump and subject to the water temperature in said chamber for reenergizing said timer motor in response to a chamber water temperature at least equalizing a given temperature, means for adjusting said given water temperature to which said thermostatic means responds, and means mounting said adjustable means in a position exposed to and readily accessible to manipulation by the user of said dishwasher.

2. In a domestic dishwasher
a washing chamber having a sump;
an electrical heater in said chamber;
timing means for normally controlling the sequence of operation in a washing cycle;
first circuit means connecting said heater for energization during at least selected portions of said cycle;
a thermostatic switch located above said sump and having a closed position in response to a water temperature in said chamber above said sump exceeding the setting of said thermostatic switch;
first circuit means including a normally energized timer motor for advancing said timing means with at least one interruption of energization of said timer motor during said operation;
an alternate circuit for effecting energization of said timer motor, said alternate circuit including said thermostatic switch;
a control panel, exposed to and readily accessible to the user of said dishwasher, said control panel mounting user manipulatable controls; and
means for effecting a change in the temperature setting of said thermostatic switch, said latter means being carried by said control panel for manipulation.

References Cited

UNITED STATES PATENTS

| | | | |
|---|---|---|---|
| 3,041,212 | 6/1962 | Booth | 134—57 X |
| 3,255,672 | 6/1966 | Wantz et al. | 137—624.2 X |
| 3,440,399 | 4/1969 | Reifenberg | 219—334 |

JOSEPH V. TRUHE, Primary Examiner

C. L. ALBRITTON, Assistant Examiner

U.S. Cl. X.R.

134—57; 219—328